United States Patent
Lai et al.

(10) Patent No.: US 7,387,541 B1
(45) Date of Patent: Jun. 17, 2008

(54) BATTERY CONNECTOR

(75) Inventors: Ming-Chun Lai, Tu-Cheng (TW); Yu Li, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/790,307

(22) Filed: Apr. 25, 2007

(51) Int. Cl.
*H01R 24/00* (2006.01)

(52) U.S. Cl. ..................................... 439/660

(58) Field of Classification Search ............... 439/660, 439/366, 166, 83
See application file for complete search history.

(56) References Cited

U.S. PATENT DOCUMENTS

| | | | |
|---|---|---|---|
| 5,816,858 A * | 10/1998 | Kazarian et al. ....... | 439/620.26 |
| 6,022,248 A * | 2/2000 | Wu et al. .................. | 439/862 |
| 6,068,519 A * | 5/2000 | Lok .......................... | 439/660 |
| 6,113,440 A * | 9/2000 | Fijten et al. .............. | 439/862 |
| 6,585,541 B2 * | 7/2003 | Higashida et al. ..... | 439/620.27 |
| 6,695,628 B2 * | 2/2004 | Yeh .......................... | 439/83 |
| 6,702,621 B2 * | 3/2004 | Yeh .......................... | 439/660 |
| 6,851,986 B2 * | 2/2005 | Zhao ........................ | 439/744 |
| 6,875,049 B2 * | 4/2005 | Kyowski et al. ......... | 439/500 |
| 2001/0021609 A1 * | 9/2001 | Chiang ..................... | 439/682 |
| 2002/0048999 A1 * | 4/2002 | Ming-Hui ................. | 439/660 |
| 2002/0049000 A1 * | 4/2002 | Tanaka et al. ............ | 439/660 |
| 2003/0216067 A1 * | 11/2003 | Yeh ........................... | 439/83 |
| 2003/0216070 A1 * | 11/2003 | Yeh ........................... | 439/131 |
| 2003/0216073 A1 * | 11/2003 | Yeh ........................... | 439/188 |
| 2004/0115998 A1 * | 6/2004 | Shirae et al. .............. | 439/760 |
| 2004/0121654 A1 * | 6/2004 | Chao et al. ............... | 439/660 |
| 2004/0161979 A1 * | 8/2004 | Kyowski et al. .......... | 439/660 |
| 2005/0054242 A1 * | 3/2005 | Hsieh ....................... | 439/660 |
| 2006/0128229 A1 * | 6/2006 | Peng et al. ................ | 439/682 |
| 2007/0232102 A1 * | 10/2007 | Huang et al. ............. | 439/166 |

\* cited by examiner

*Primary Examiner*—T. C. Patel
*Assistant Examiner*—Vladimir Imas
(74) *Attorney, Agent, or Firm*—Rosenberg, Klein & Lee

(57) ABSTRACT

A battery connector includes an insulating housing and a plurality of terminals having a mounting member, a first elastic portion and a second elastic portion all accommodated in the insulating housing. The insulating housing includes two sidewalls, a top wall, a bottom wall, a front wall and a back wall. The top wall defines a plurality of receiving cavities that pass through the front wall and the back wall partly. The back wall defines a blocking portion which has a preventing surface. The front end of the mounting member bends upward and extends to form a soldering portion. A connecting portion extends from the rear end of the second elastic portion and tilts upward and is above the blocking portion. A contacting portion is exposed out of the insulating housing. As compressed, the connecting portion is supported by the blocking portion and slides along the preventing surface.

6 Claims, 5 Drawing Sheets

BATTERY CONNECTOR

BACKGROUND OF THE INVENTION

1. Field of the Invention

This present invention generally relates to a battery connector, and more particularly to a battery connector capable of extending the using life of the terminals thereof.

2. The Related Art

A battery connector is widely used in a mobile phone or other electronic device for electrical connection between an electronic device and a battery.

Referring to TW Pat. No. M267714, a conventional battery connector disclosed in the patent includes an insulating housing and a plurality of terminals accommodated in the insulating housing respectively. The terminal includes a connecting portion, an elastic portion and a locating portion. The connecting portion is V-shaped with one end bulging inner and the other end curved and extending to form the elastic portion. The elastic portion is S-shaped. The other end of the elastic portion connects with the locating portion which includes a soldering portion.

However, when the battery connector described above is in use, the connecting portion is compressed and further leads the elastic portion compressed. Then the elastic portion is in the state of impaction. If the battery connector is used frequently, the action force of the terminal is easy to become fatigue and it leads the elastic force weaken between the terminal and the battery. Therefore, the electrical connection between the battery and the electronic device is not stable.

SUMMARY OF THE INVENTION

An object of the present invention is to provide a battery connector capable of extending the using life of the terminals thereof. The battery connector includes an insulating housing and a plurality of terminals accommodated in the insulating housing. The insulating housing includes a top wall, a bottom wall, a front wall, a back wall and two sidewalls. The top wall defines a plurality of receiving cavities that pass through the front wall and the back wall partly. The back wall defines a blocking portion which has a preventing surface. The preventing surface inclines to back and faces to the inner of the receiving cavity. The terminal has a mounting member. The front end of the mounting member bends upward and extends to form a soldering portion for electrically connecting to a printed circuit board. The end of the mounting member bends upward and then extends forward to form a first elastic portion. The first elastic portion stretches forward and the front end of the first elastic portion bends upward and then extends backward to form a second elastic portion. The first elastic portion and the second elastic portion are housed in the receiving cavity. A connecting portion is extended from the rear end of the second elastic portion and tilts upward and is above the blocking portion of the insulating housing. The upper end of the connecting portion bends downward to form a contacting portion. The contacting portion is exposed out of the insulating housing.

As mentioned above, when the battery connector is in use, a battery compresses the contacting portion and the connecting portion is supported by the blocking portion and slides along the preventing surface. The force acted on the battery is mainly from the blocking portion that acts on the connecting portion. Therefore, the force on the terminal is lightened and the using life of the terminal is prolonged. At the same time it ensures the stable contact between the battery and the battery connector.

BRIEF DESCRIPTION OF THE DRAWINGS

A detailed explanation of a preferred embodiment of the present invention will be given, with reference to the attached drawings, for better understanding thereof to those skilled in the art.

DETAILED DESCRIPTION OF THE PREFERRED EMBODIMENT

Figure 1:
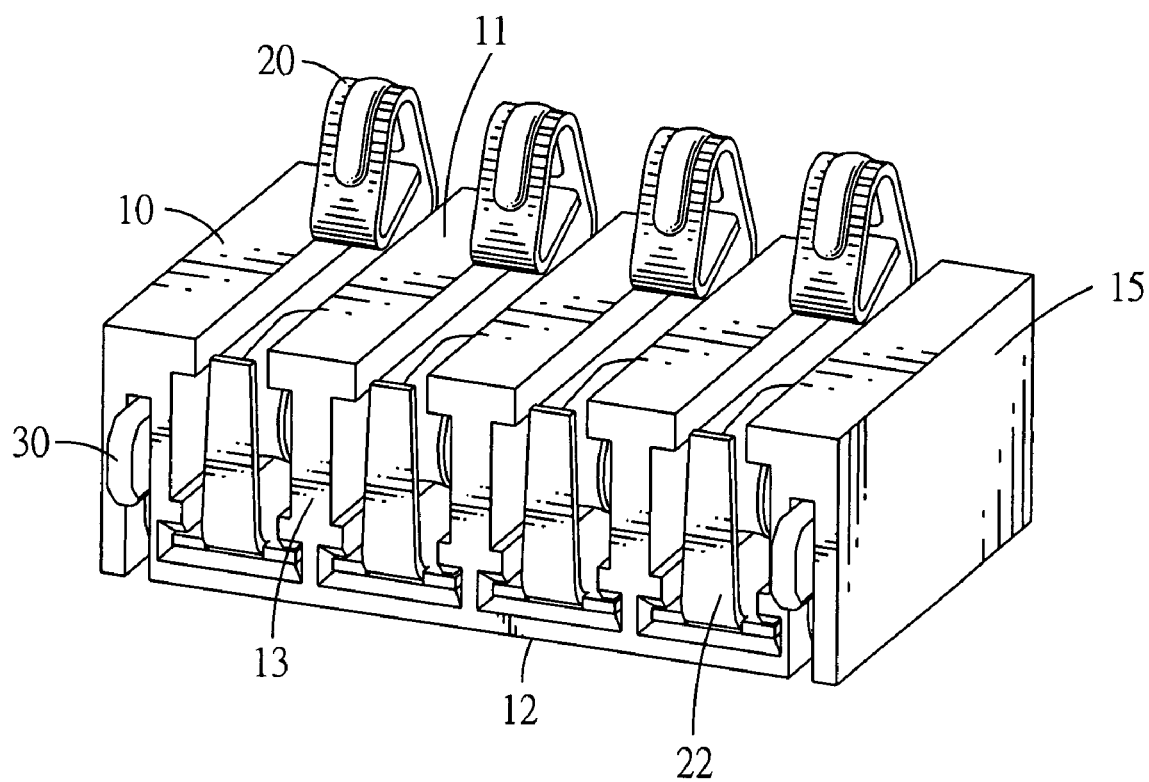
FIG. 1 is a perspective view of a battery connector in accordance with the present invention.

Referring to FIG. 1, a battery connector 1 in accordance with the present invention includes an insulating housing 10, a plurality of terminals 20 received in the insulating housing 10, and a pair of locking pillars 30 inlayed in the insulating housing 10.

Figure 2:
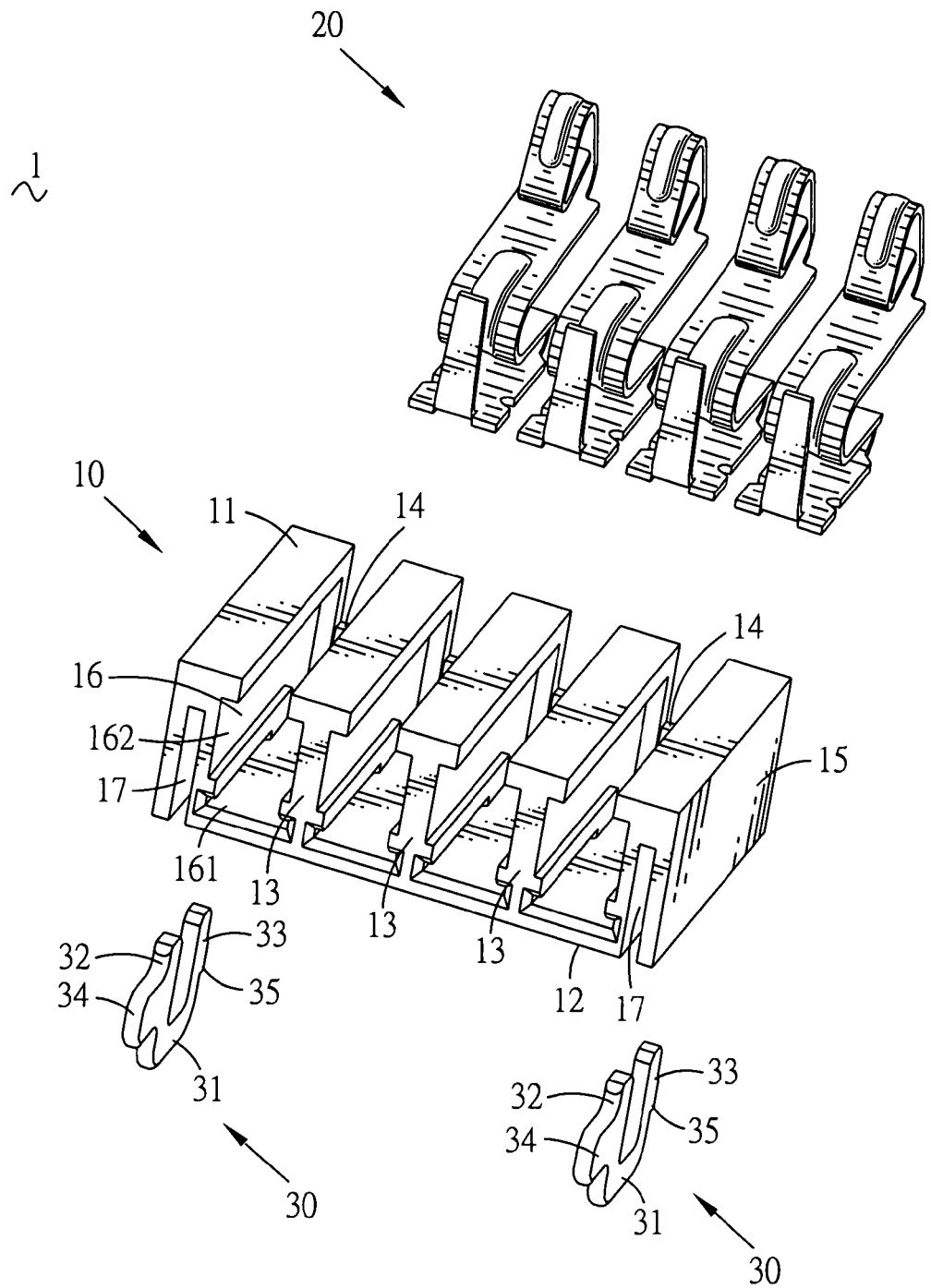
FIG. 2 is an exploded view of the battery connector shown in FIG. 1.
Figure 3:
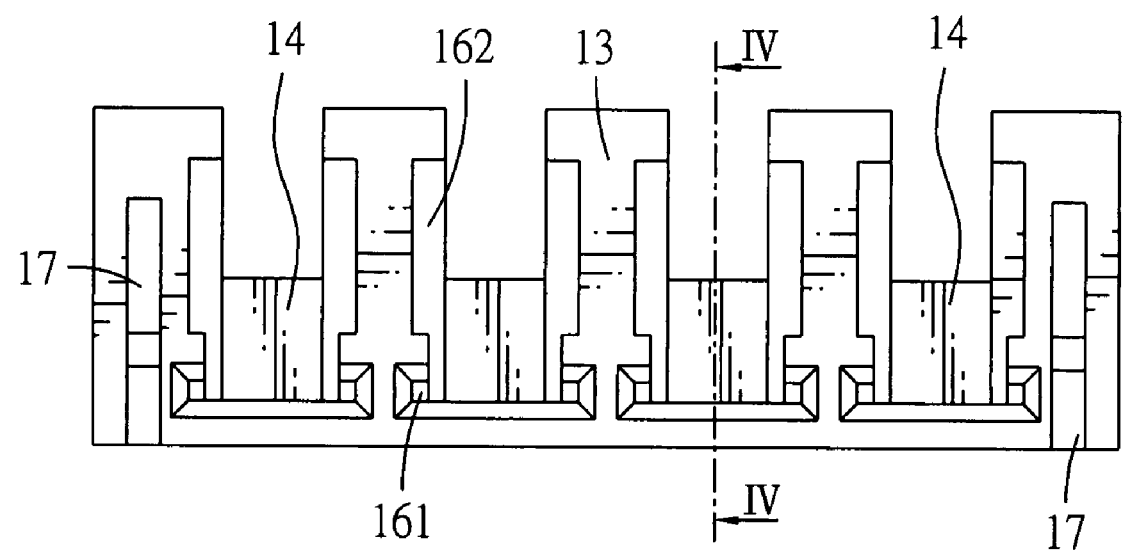
FIG. 3 is a front view of an insulating housing of the battery connector.
Figure 4:
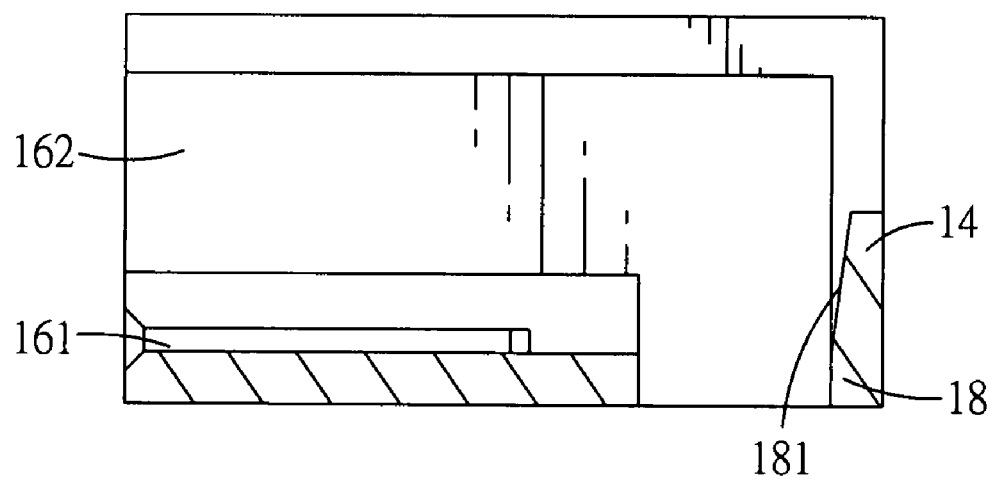
FIG. 4 is a cross-sectional view of the insulating housing taken substantially along line IV-IV of FIG. 3.

With reference to FIGS. 2-4, the insulating housing 10 is arranged transversely, including a top wall 11, a bottom wall 12, a front wall 13, a back wall 14 and two sidewalls 15. A plurality of receiving cavities 16 are defined lengthways through the top wall 11 and the front wall 13 and are parallel to each other. The receiving cavity 16 further includes a holding cavity 162 and a locating cavity 161. The holding cavity 162 and the locating cavity 161 hollow outside respectively and then the opening formed in the top wall 11 is narrower than the holding cavity 162 and the locating cavity 161. The locating cavity 161 is defined in the inner bottom portion of the insulating housing 10 and passes through the holding cavity 162 to the top wall 11. The holding cavity 162 passes through the back wall 14 partly. The back wall 14 forms a blocking portion 18 from the middle portion thereof to the bottom wall 12. The blocking portion 18 has a preventing surface 181 that inclines to back and faces to the inner of the receiving cavity 16. The sidewall 15 defines an inlay slot 17 passing through the front wall 13 and the bottom wall 12.

Figure 5:
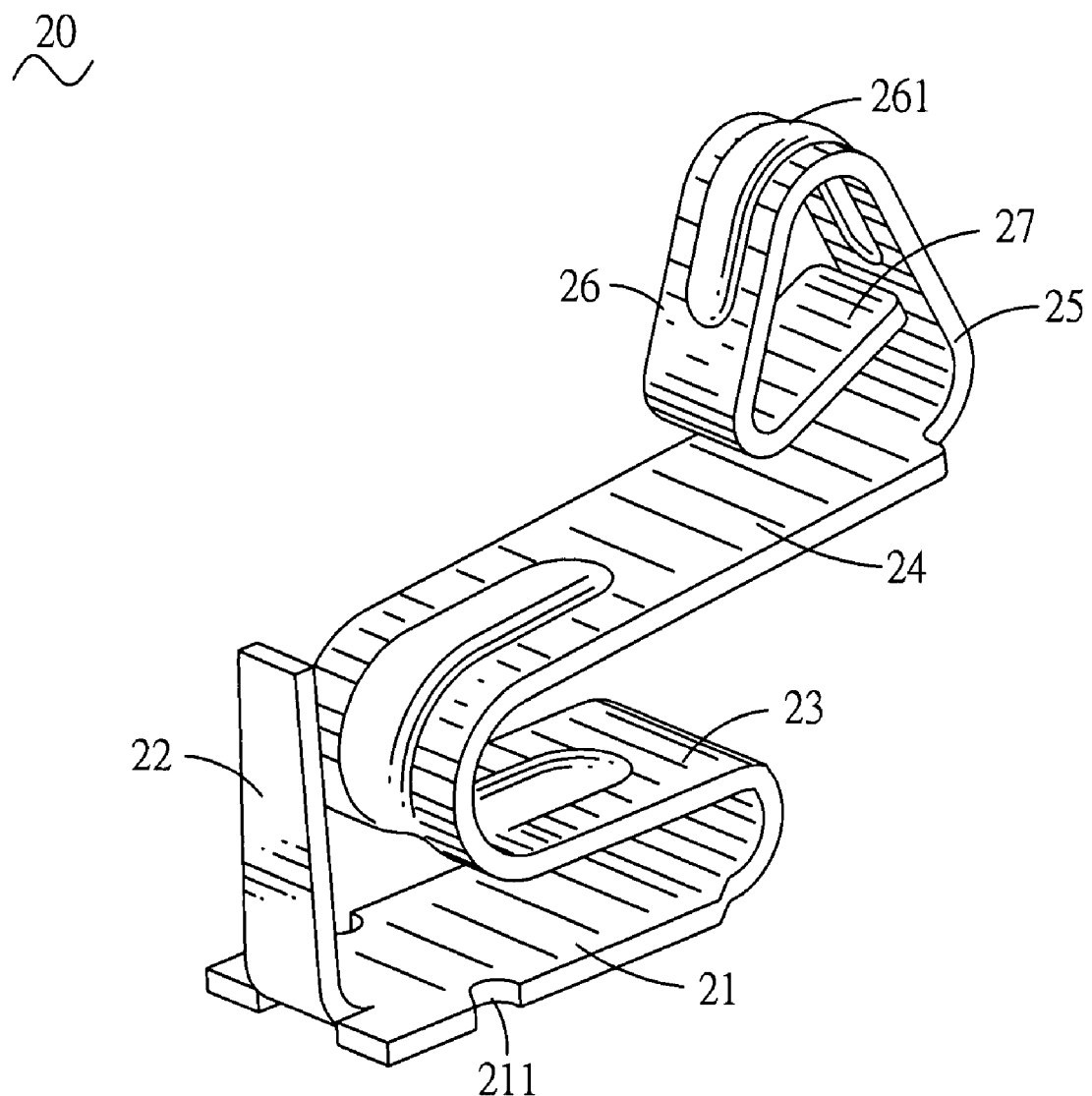
FIG. 5 is a perspective view of a terminal of the battery connector.

As shown in FIG. 5, the terminal 20 accommodated in the receiving cavity 16 extends lengthways to form a mounting member 21. The mounting member 21 is a rectangular sheet and defines a concave 211 at its each side. The front end of the mounting member 21 bends upward and extends to form a plane soldering portion 22 for electrically connecting to a printed circuit board (not shown). The rear end of the mounting member 21 bends upward and then extends forward to form a first elastic portion 23 that is parallel to the mounting member 21. The first elastic portion 23 stretches forward and the front end of the first elastic portion 23 bends upward and then extends backward to form a second elastic portion 24. The connection of the mounting member 21, the first elastic portion 23 and the second elastic portion 24 is S-shaped and the second elastic portion 24 is longer than the first elastic portion 23. The rear end of the second elastic portion 24 tilts upward a bit. The width of the mounting member 21, the first elastic portion 23 and the second elastic portion 24 is same and wider than the opening of the top wall 11 that the receiving cavity 16 passes through. A connecting portion 25 is extended from the rear end of the second elastic portion 24 and tilts upward and is above the blocking portion 18 of the insulating housing 10. The upper end of the connecting portion 25 bends downward to form a V-shaped contacting portion 26. The contacting portion 26 has a convexity 261 that ensures a reliable contact between the terminal 20 and a contact face of a battery (not shown). The end of contacting portion 26 tilts upward a bit to form a free end portion 27. The width of the connecting portion 25, the contacting portion 26 and the free end portion 27 is narrower than the opening of the top wall 11.

Please refer to FIG. 2 once again, the locking pillar 30 has a U-shaped body member 31 including a first arm 32 and a second arm 33. The first arm 32 defines a locating member 34 stretching outward. The second arm 33 defines a tab 35 opposite to the locating member 34.

Figure 6:
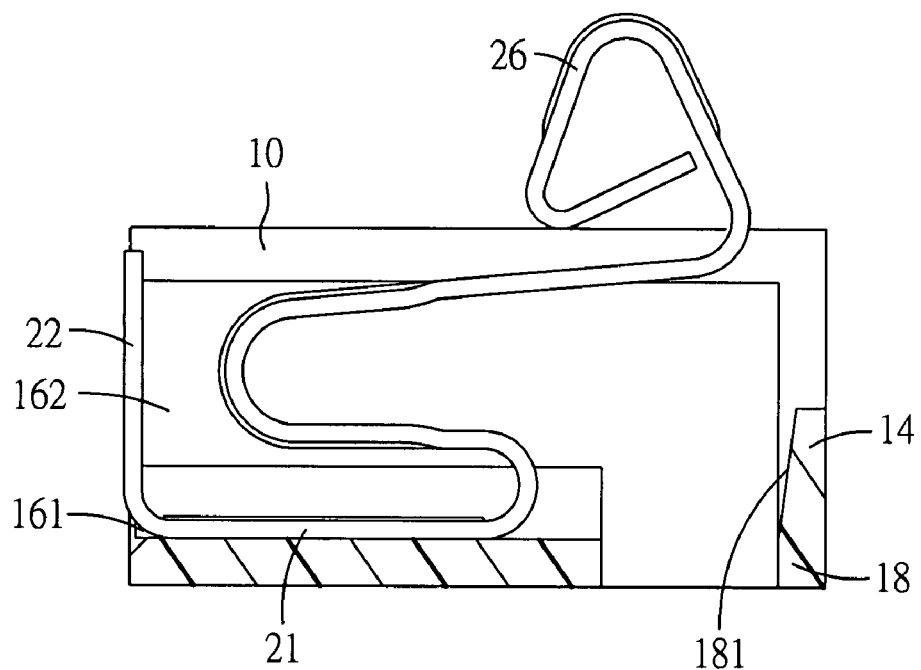
FIG. 6 is a cross-sectional view of the battery connector shown in FIG. 1.

Please refer to FIG. 1 in conjunction with FIG. 6, in assemble, the mounting member 21 of the terminal 20 is received in the locating cavity 161 of the insulating housing 10 with the first elastic portion 23 and the second elastic portion 24 received in the holding cavity 162. The contacting portion 26 is exposed out of the insulating housing 10. The soldering portion 22 is arranged in the front of the front wall 13 of the insulating housing 10 to electrically connect with the printed circuit board. Because the width of the mounting member 21, the first elastic portion 23 and the second elastic portion 24 is wider than the opening of the top wall 11 that the receiving cavity 16 passes through, then when the battery is taken out from the battery connector 1, the elastic force from the terminal 20 cannot make the terminal 20 itself tilt out of the insulating housing 10. The locking pillar 30 is inserted in the inlay slot 17 to locate the insulating housing 10 on the printed circuit board.

Figure 7:
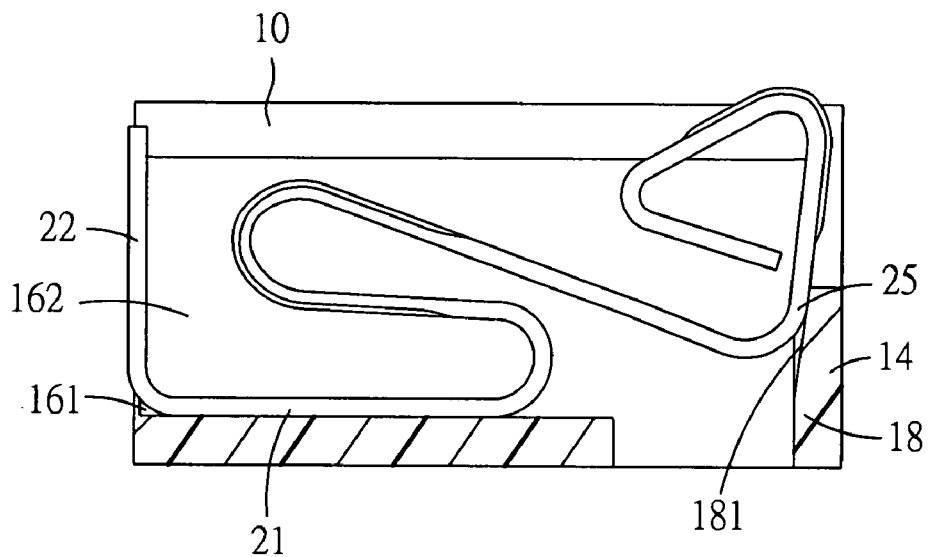
FIG. 7 illustrates the terminal of the battery connector when it is compressed.

Referring to FIG. 7, when the battery is installed in the battery connector 1, the battery compresses the contacting portion 26 of the terminal 20. The compressed contacting portion 26 further presses the second elastic portion 24 and the first elastic portion 23 and it causes the second elastic portion 24 and the first elastic portion 23 to become deformed. At this time, the force acted on the battery is from the terminal 20 itself. Subsequently, the contacting portion 26 is compressed continually, and then the connecting portion 25 is supported by the blocking portion 18. The connecting portion 25 slides long the preventing surface 181. So at now the force acted on the battery is mainly from the blocking portion 18 that acts on the connecting portion 25. Therefore, the force on the terminal 20 is lightened and the using life of the terminal 20 is prolonged. It ensures the stable contact between the battery and the battery connector 1.

Although preferred embodiment of the present invention have been described in detail hereinabove, it should be clearly understand that many variations and/or modifications of the basic inventive concepts herein taught which may appear to those skilled in the present art will fall within the spirit and scope of the present invention, as defined in the appended claims.

What is claimed is:

1. A battery connector comprising:
   an insulating housing, having a top wall, a bottom wall, a front wall, a back wall and two sidewalls, the top wall defining a plurality of receiving cavities that pass through the front wall and the back wall partly, the back wall defining a blocking portion which has a preventing surface, the preventing surface inclining to back and facing to the inner of the receiving cavity; and
   a plurality of terminals, accommodated in the insulating housing respectively, the terminal having a mounting member, the front end of the mounting member bending upward and extending to form a soldering portion for electrically connecting to a printed circuit board, the rear end of the mounting member bending upward and then extending forward to form a first elastic portion, the first elastic portion stretching forward and the front end of the first elastic portion bending upward and then extending backward to form a second elastic portion, the first elastic portion and the second elastic portion being housed in the receiving cavity, a connecting portion extended from the rear end of the second elastic portion and tilting upward, the upper end of the connecting portion bending downward to form a contacting portion, the contacting portion exposed out of the insulating housing, the contacting portion being compressed, the connecting portion supported by the blocking portion and sliding along the preventing surface.

2. The battery connector as claimed in claim 1, wherein the width of the mounting member, the first elastic portion and the second elastic portion is same and wider than the opening of the top wall that the receiving cavity passes through.

3. The battery connector as claimed in claim 1, wherein the second elastic portion is longer then the first elastic portion.

4. The battery connector as claimed in claim 1, wherein the connecting portion is extended from the rear end of the second elastic portion and is above the blocking portion of the insulating housing.

5. The battery connector as claimed in claim 1, wherein the end of the contacting portion tilts upward a bit to form a free end portion.

6. The battery connector as claimed in claim 1, wherein the contacting portion defines a convexity that ensures a reliable contact between the terminal and a contact face of a battery.

* * * * *